(12) United States Patent
Okumura et al.

(10) Patent No.: US 7,862,933 B2
(45) Date of Patent: Jan. 4, 2011

(54) LITHIUM SECONDARY BATTERY

(75) Inventors: Takefumi Okumura, Hitachinaka (JP);
Takahiro Yamaki, Hitachinaka (JP);
Masanori Yoshikawa, Hitachinaka (JP);
Yoshimi Yanai, Kitaibaraki (JP);
Toyotaka Yuasa, Hitachi (JP)

(73) Assignee: Hitachi Vehicle Energy, Ltd., Ibaraki (JP)

( * ) Notice: Subject to any disclaimer, the term of this patent is extended or adjusted under 35 U.S.C. 154(b) by 163 days.

(21) Appl. No.: 12/019,858

(22) Filed: Jan. 25, 2008

(65) Prior Publication Data
US 2008/0241701 A1 Oct. 2, 2008

(30) Foreign Application Priority Data

Mar. 27, 2007 (JP) ............................. 2007-080449
Oct. 26, 2007 (JP) ............................. 2007-278278

(51) Int. Cl.
*H01M 6/16* (2006.01)
(52) U.S. Cl. ...................... 429/332; 429/324; 429/322; 429/188
(58) Field of Classification Search ................ 429/332, 429/324, 322, 188
See application file for complete search history.

(56) References Cited

U.S. PATENT DOCUMENTS

| | | | | |
|---|---|---|---|---|
| 2002/0136949 | A1* | 9/2002 | Gan et al. ................. | 429/212 |
| 2005/0164094 | A1 | 7/2005 | Kotato et al. | |
| 2005/0170253 | A1* | 8/2005 | Yoon et al. ................. | 429/307 |
| 2006/0166096 | A1* | 7/2006 | Abe et al. ................. | 429/231.8 |
| 2006/0183024 | A1 | 8/2006 | Suzuki | |
| 2007/0190419 | A1* | 8/2007 | Takezawa ................. | 429/231.1 |

FOREIGN PATENT DOCUMENTS

| | | |
|---|---|---|
| CN | 1373529 | 10/2002 |
| CN | 1406398 | 3/2003 |
| CN | 1677740 | 10/2005 |
| EP | 1 009 057 | 6/2000 |
| EP | 1 341 246 | 9/2003 |
| JP | 09-245838 | 9/1997 |
| JP | 2705529 | 10/1997 |
| JP | 10-027625 | 1/1998 |
| JP | 2001-148258 | 5/2001 |

(Continued)

OTHER PUBLICATIONS

Office Action of Chinese Application No. 2008100089236 dated Mar. 27, 2009.

*Primary Examiner*—Jane Rhee
(74) *Attorney, Agent, or Firm*—Antonelli, Terry, Stout & Kraus, LLP.

(57) ABSTRACT

The present invention provides a lithium secondary battery which has improved safety, mainly coming from use of an electrolyte solution which is not inflammable at room temperature (20° C.), while not deteriorating output characteristics at low temperatures and room temperature or output maintenance characteristics after storage at high temperature (50° C.). The lithium secondary battery of the present invention, encased in a container, is provided with a cathode and an anode, both capable of storing/releasing lithium ions, a separator which separates these electrodes from each other, and an electrolyte solution containing a cyclic carbonate and a linear carbonate as solvents and a compound such as VC at composition ratios of 18.0 to 30.0%, 74.0 to 81.9% and 0.1 to 1.0%, respectively, based on the whole solvents, all percentages by volume.

8 Claims, 2 Drawing Sheets

FOREIGN PATENT DOCUMENTS

| | | |
|---|---|---|
| JP | 2002-305035 | 10/2002 |
| JP | 2003-203634 | 7/2003 |
| JP | 2003-323915 | 11/2003 |
| JP | 2005-222780 | 8/2005 |
| JP | 2007-66864 | 3/2007 |
| WO | WO 2006/123811 | 11/2006 |

* cited by examiner

LITHIUM SECONDARY BATTERY

BACKGROUND OF THE INVENTION

The present invention relates to a novel lithium secondary battery having a high input/output performance and suitable for hybrid electric vehicles and the like.

Hybrid electric vehicles, in which an engine and a motor serve as power sources, have been developed and commercialized for environmental protection and energy saving. Moreover, fuel cell hybrid electric vehicles in which a fuel cell is used in place of an engine have been extensively under development for vehicles in the future.

Secondary batteries, which can undergo a number of charging/discharging cycles, are essential devices as power sources for hybrid electric vehicles.

Of secondary batteries, lithium secondary batteries are promising, because of their high operational voltage and capability of generating a high output, and are of increasing importance as power sources for hybrid electric vehicles.

An electrolyte solution for lithium secondary batteries is required to have high voltage-resistant characteristics, and an organic electrolyte solution containing an organic solvent is used.

However, an organic solvent involves disadvantages of poor solubility for lithium salts and large dependence of its conductivity on temperature, thus resulting in a marked deterioration in operational characteristics at low temperatures over those at room temperature.

Carbonate ester compounds are now mainly used as solvents for organic electrolyte solutions for lithium secondary batteries, because of their high voltage-resistant characteristics.

Cyclic carbonate ester solvents have a high viscosity, although they have a high solubility for lithium salts. Linear carbonate ester solvents, on the other hand, have a low solubility for lithium salts, although they have a low viscosity.

Hence, a mixture of cyclic and linear carbonate esters is generally used as the electrolyte solutions.

For improvement of low-temperature characteristics of electrolyte solutions, Patent Documents 1 to 5 shown below disclose use of a linear carbonate ester incorporated with ethyl methyl carbonate (EMC) of an asymmetric structure.

Patent Document 6 shown below discloses use of an acetate ester, which has a lower molecular weight than EMC and works as a solvent of a low viscosity and a low melting point.

Patent Document 1: JP-B-2,705,529

Patent Document 2: JP-A-10-027625

Patent Document 3: JP-A-2001-148258

Patent Document 4: JP-A-2002-305035

Patent Document 5: JP-A-2003-323915

Patent Document 6: JP-A-09-245838

It is an object of the present invention to provide a lithium secondary battery which uses an electrolyte solution exhibiting no inflammability at room temperature (20° C.) and not deteriorating output characteristics of the battery at low temperatures and room temperature.

SUMMARY OF THE INVENTION

The present invention provides a lithium secondary battery comprises a cathode and an anode, both capable of storing/releasing a lithium ion, a separator which separates these electrodes from each other, and an electrolyte solution, wherein the electrolyte solution comprises as solvents:

a cyclic carbonate represented by the formula (1):

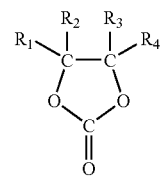

(Formula 1)

(wherein, $R_1$, $R_2$, $R_3$ and $R_4$ may be the same or different and are each hydrogen, fluorine, chlorine, an alkyl group or a fluorinated alkyl group, each having 1 to 3 carbons), a linear carbonate represented by the formula (2):

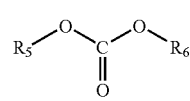

(Formula 2)

(wherein, $R_5$ and $R_6$ may be the same or different and are each hydrogen, fluorine, chlorine, an alkyl group or a fluorinated alkyl group, each having 1 to 3 carbons, which) and a compound represented by the formula (3):

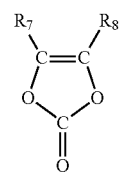

(Formula 3)

(wherein, $R_7$ and $R_8$ may be the same or different and are each hydrogen, fluorine, chlorine, an alkyl group or a fluorinated alkyl group, each having 1 to 3 carbons), and the composition ratio of the cyclic carbonate represented by the formula (1) is 18.0 to 30.0%, the composition ratio of the linear carbonate represented by the formula (2) is 74.0 to 81.9% and the composition ratio of the compound represented by the formula (3) is 0.1 to 1.0%, based on the whole solvents (100%), all percentages by volume.

The cathode mixture layer has a porosity of 25 to 40%, inclusive, and the anode mixture layer also has a porosity of 25 to 40%, inclusive, based on the respective layers, all percentages by volume.

The cathode comprises a cathode mixture and a cathode-side current collector, wherein the cathode mixture comprises a cathode-active material, an electroconductive agent and a binder, and is spread over the cathode-side current collector to form a cathode mixture layer thereon.

The anode comprises an anode mixture and an anode-side current collector, wherein the anode mixture comprises an anode-active material, an electroconductive agent and a binder, and is spread over the anode-side current collector to form an anode mixture layer thereon.

The present invention can provide a lithium secondary battery which uses an electrolyte solution exhibiting no inflammability at room temperature (20° C.) and not deteriorating output characteristics of the battery at low temperatures and room temperature.

Other objects, features and advantages of the invention will become apparent from the following description of the embodiments of the invention taken in conjunction with the accompanying drawings.

DESCRIPTION OF REFERENCE NUMERALS

Figure 1:
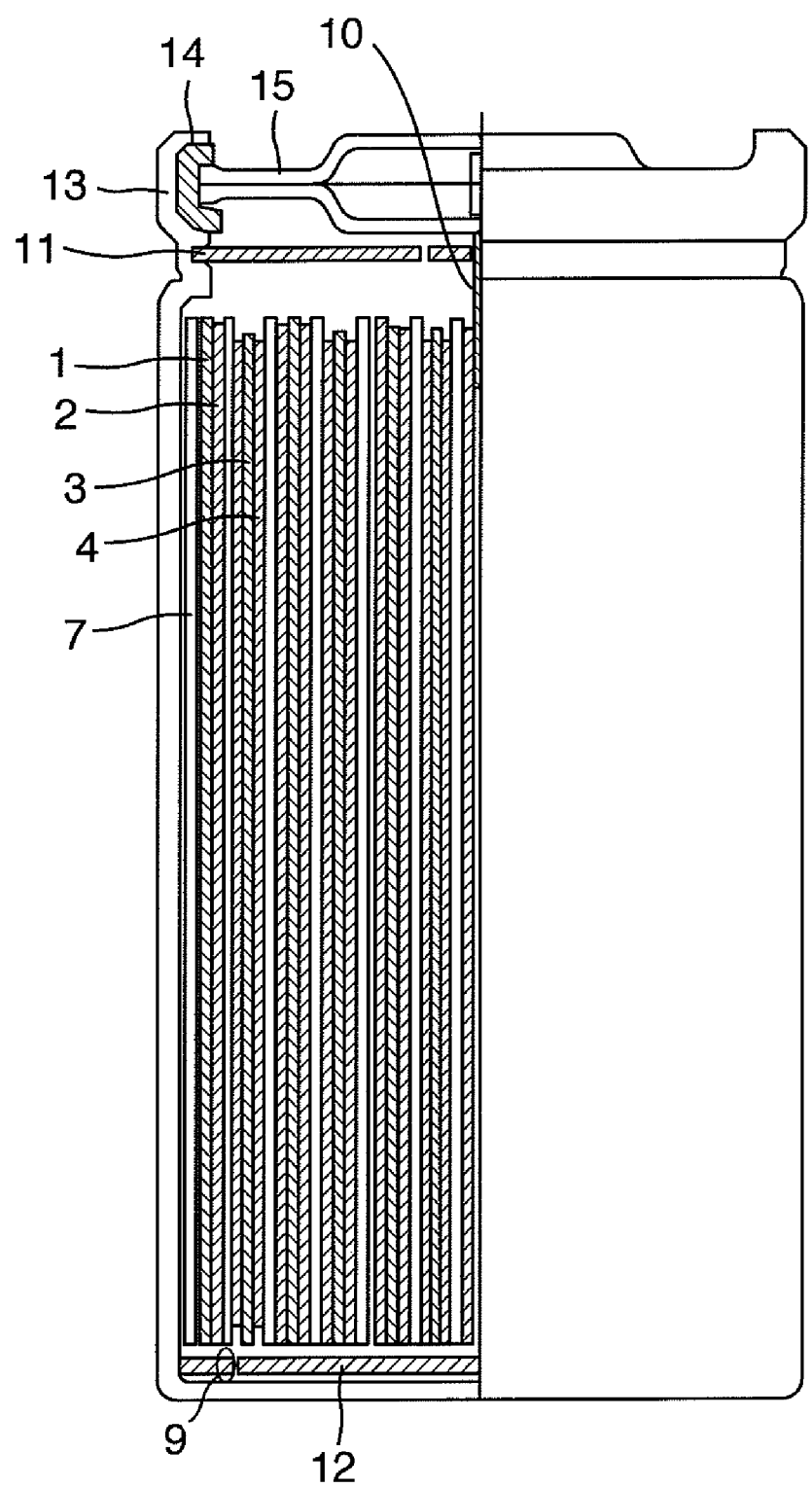
FIG. 1 is a cross-sectional view illustrating one side of a spirally wound battery prepared in each of Examples.

1 Cathode-side current collector
2 Cathode mixture layer
3 Anode-side current collector
4 Anode mixture layer
7 Separator
9 Anode-side lead
10 Cathode-side lead
11 Cathode-side insulator
12 Anode-side insulator
13 Anode battery can
14 Gasket
15 Cathode battery lid

DETAILED DESCRIPTION OF THE INVENTION

The present invention comprises a cathode of a cathode mixture comprising a lithium composite oxide, an electroconductive agent mainly composed of graphite-base carbon and a binder, spread on an aluminum foil, wherein the cathode mixture layer has a porosity of 25 to 40% by volume, inclusive, based on the layer. When the porosity is less than 25%, the electrolyte solution may not permeate the cathode mixture layer in a sufficient quantity to decrease the number of lithium ions in the layer. As a result, the lithium secondary battery may not produce a sufficient output due to short supply of the lithium ions to the cathode-active material, in particular at low temperatures. When the porosity is more than 40%, on the other hand, the content of the cathode mixture in the layer may be insufficient to cause insufficient input/output.

The anode for the present invention comprises an anode mixture comprising amorphous carbon, an electroconductive agent and a binder, spread on a copper foil, wherein the anode mixture layer has a porosity of 25 to 40% by volume, inclusive, based on the layer. When the porosity is less than 25%, the electrolyte solution may not permeate the anode mixture layer in a sufficient quantity. As a result, the lithium secondary battery may not produce a sufficient input due to short supply of lithium ions to the anode-active material, in particular at low temperatures. When the porosity is more than 40%, on the other hand, the content of the anode mixture in the layer may be insufficient to cause insufficient input/output.

The solvents represented by the formula (1) include ethylene carbonate (EC), trifluoropropylene carbonate (TFPC), chloroethylene carbonate (ClEC), trifluoroethylene carbonate (TFEC), difluoroethylene carbonate (DFEC) and vinyl ethylene carbonate (VEC).

Of the above compounds, EC is more preferable, viewed from formation of a coating film on the anode.

Incorporation of a small quantity (2% by volume or less) of ClEC, TFEC or VEC imparts good cycle characteristics to a coating film on the electrode.

Moreover, TFPC or DFEC may be incorporated in a small quantity (2% by volume or less) for facilitating formation of a coating film on the cathode.

The solvents represented by the formula (2) include dimethyl carbonate (DMC), ethyl methyl carbonate (EMC), diethyl carbonate (DEC), methyl propyl carbonate (MPC), ethyl propyl carbonate (EPC), trifluoromethyl ethyl carbonate (TFMEC) and 1,1,1-trifluoroethyl methyl carbonate (TFEMC).

DMC is highly compatible with many solvents, and is suitable for being mixed with EC or the like.

DEC has a lower melting point than DMC, and is suitable for improving low-temperature (−30° C.) characteristics.

EMC has an asymmetric structure and also a low melting point, and is suitable for improving low-temperature characteristics.

EPC and TFMEC have a propylene side chain and asymmetric structure, and are suitable as solvents for adjusting low-temperature characteristics.

TFEMC has a molecule partly fluorinated to have an increased dipole moment, and is suitable for keeping dissociation of lithium salts at low temperatures and also for improving low-temperature characteristics.

The compounds represented by the formula (3) include vinylene carbonate (VC), methylvinylene carbonate (MVC), dimethylvinylene carbonate (DMVC), ethylvinylene carbonate (EVC) and diethylvinylene carbonate (DEVC).

VC has a low molecular weight, and is considered to form a dense coating film on the electrode. MVC, DMVC, EVC, DEVC or the like is a VC substituted with an alkyl group and is considered to form a low-density coating film on the electrode, magnitude of density depending on size of the alkyl chain with which the compound is substituted, thus to have the effect of improving low-temperature characteristics.

The lithium salt for the electrolyte solution is not limited. The lithium salts useful for the present invention include inorganic lithium salts, e.g., $LiPF_6$, $LiBF_4$, $LiClO_4$, LiI, LiCl and LiBr; and organic lithium salts, e.g., $LiB[OCOCF_3]_4$, $LiB[OCOCF_2CF_3]_4$, $LiPF_4(CF_3)_2$, $LiN(SO_2CF_3)_2$ and $LiN(SO_2CF_2CF_3)_2$.

In particular, $LiPF_6$, which has been widely used for batteries for domestic purposes, is a suitable compound because of its quality stability.

Moreover, $LiB[OCOCF_3]_4$ is an effective compound, because it exhibits high dissociation capability and solubility, and also high conductivity even at a low content.

An electrolyte solution preferably has a flash point of 21° C. or higher and an ion conductivity of 2 mS/cm or more at −30° C. to simultaneously satisfy safety and low-temperature characteristics.

It is preferable to incorporate DMC and EMC in a ratio of 0.6 to 1.3 by volume, particularly preferably 0.8 to 1. A DMC/EMC ratio of 0.6 to 1.3 will secure an electrolyte solution having a flash point of 21° C. or higher and an ion conductivity of 2 mS/cm or more at −30° C. Moreover, a DMC/EMC ratio of 0.8 to 1 will secure an electrolyte solution having a flash point of 21° C. or higher and an ion conductivity of 2.2 mS/cm or more at −30° C., and hence is more preferable.

The anode-active materials useful for the present invention include natural graphite, composite carbonaceous material with natural graphite coated with a film formed by dry chemical vapor deposition (CVD) or wet spraying, synthetic graphite produced by sintering a resin (e.g., epoxy or phenolic resin) or pitch from petroleum or coal, another carbonaceous material (e.g., amorphous material), lithium metal having a capability of storing/releasing lithium by forming a compound with lithium, silicon reacting with lithium to form a compound to have a capability of storing/releasing lithium by being held in the interstices between the crystals, and oxide or nitride of an element belonging to the IV group (e.g., germanium or tin). They may be generally referred to as anode-active materials. In particular, a carbonaceous material is an excellent material because of its high electroconductivity, low-temperature characteristics and good cycle stability.

Of carbonaceous materials, those having a wide interlayer space between carbon network planes ($d_{002}$) are suitable for their rapid charging/discharging capability and excellent low-temperature characteristics.

It should be noted, however, that some carbonaceous materials having a wide $d_{002}$ value show insufficient capacity or charging/discharging efficiency during the initial stage of charging, and hence they preferably have a $d_{002}$ value of 0.39 nm or less. Such a material may be sometimes referred to as pseudo-anisotropic carbon.

Moreover, the electrode may be incorporated with a highly electroconductive carbonaceous material, e.g., graphite-like material, amorphous material or activated carbon.

Graphite-like materials useful for the present invention include those having one of the following characteristics (1) to (3):

(1) an R value, or $I_D/I_G$ ratio, of 0.2 to 0.4, inclusive, wherein $I_D$ is intensity of the peak in a range from 1300 to 1400 $cm^{-1}$, and $I_G$ is intensity of the peak in a range from 1580 to 1620 $cm^{-1}$, both in a Raman spectral pattern, (2) a half width $\Delta$ of 40 to 100 $cm^{-1}$, inclusive, of the peak in a range from 1300 to 1400 $cm^{-1}$ in a Raman spectral pattern, and (3) an X value, or $I_{(110)}/I_{(004)}$ ratio, of 0.1 to 0.45, inclusive, wherein $I_{(110)}$ is peak intensity from the (110) plane and $I_{(004)}$ is peak intensity from the (004) plane, both in an X-ray diffraction pattern.

A lithium composite oxide as the cathode-active material preferably has a composition represented by the formula $Li_\alpha Mn_x M1_y M2_z O_2$ (wherein, M1 is at least one selected from the group consisting of Co and Ni, M2 is at least one selected from the group consisting of Co, Ni, Al, B, Fe, Mg and Cr, x+y+z=1, 0<$\alpha$<1.2, 0.2$\leq$x$\leq$0.6, 0.2$\leq$y$\leq$0.4 and 0.05$\leq$z$\leq$0.4).

Of these materials, those having Ni or Co as M1, and Co or Ni as M2 are more preferable. $LiMn_{1/3}Ni_{1/3}Co_{1/3}O_2$ is still more preferable. The composition has an increased capacity as the Ni content increases, an increased output at low temperatures as the Co content increases, and decreases in production cost as the Mn content increases. The additive elements have effects of improving cycle characteristics. Other compounds, e.g., those represented by the general formula $LiM_xPO_4$ (M: Fe or Mn, and 0.01$\leq$X$\leq$0.4), and orthorhombic phosphorus compounds having space group Pmnb symmetry represented by $LiMn_{1-x}M_xPO_4$ (M: divalent cation other than Mn, and 0.01$\leq$X$\leq$0.4) may be also used for the present invention.

$LiMn_{1/3}Ni_{1/3}Co_{1/3}O_2$, in particular, is suitable as a lithium battery material for hybrid electric vehicles (HEVs) because of its high low-temperature characteristics and cycle stability.

The lithium secondary battery described above as one embodiment of the present invention has improved safety over conventional lithium secondary batteries, mainly coming from use of an electrolyte solution which is not inflammable at room temperature (20° C.) while not deteriorating output characteristics at low temperatures and room temperature or output maintenance characteristics during storage at high temperatures over an extended period. As such, it can find wide use in various areas, e.g., power sources for hybrid electric vehicles, and power sources including back-up power sources for electrically driven control systems for vehicles. Moreover, it is also suitable as a power source for industrial machines, e.g., electrically driven tools and forklifts.

Moreover, the lithium secondary battery as one embodiment of the present invention has improved characteristics, in particular output characteristics at low temperatures, and useful for vehicles frequently working in cold districts. The improved output characteristics at low temperatures reduce size and weight of a module in which the batteries are assembled to produce power of several hundred volts by reducing a required number of the batteries.

The best mode for carrying out the present invention is specifically described by Examples.

Example 1

An electrolyte solution was prepared by dissolving $LiPF_6$ as a lithium salt to a concentration of 1 M in a mixed solvent of EC:VC:DMC:EMC having a composition ratio of 19.4: 0.6:40:40 by volume. The electrolyte solution was not inflammable as confirmed by the flash point test carried out at 20° C.

Flash point was determined using an automatic tag closed flash point tester in accordance with JIS K-2265.

(Evaluation of Ion Conductivity)

The sample solution (5 mL) put in a glass bottle was measured for its ion conductivity at −30° C. by a digital electro-conductivity meter (CM-60V, Toa Denpa) whose electrodes were immersed in the sample solution, where the measurement was started 90 minutes after the bottle was held in a constant-temperature bath.

Figure 2:
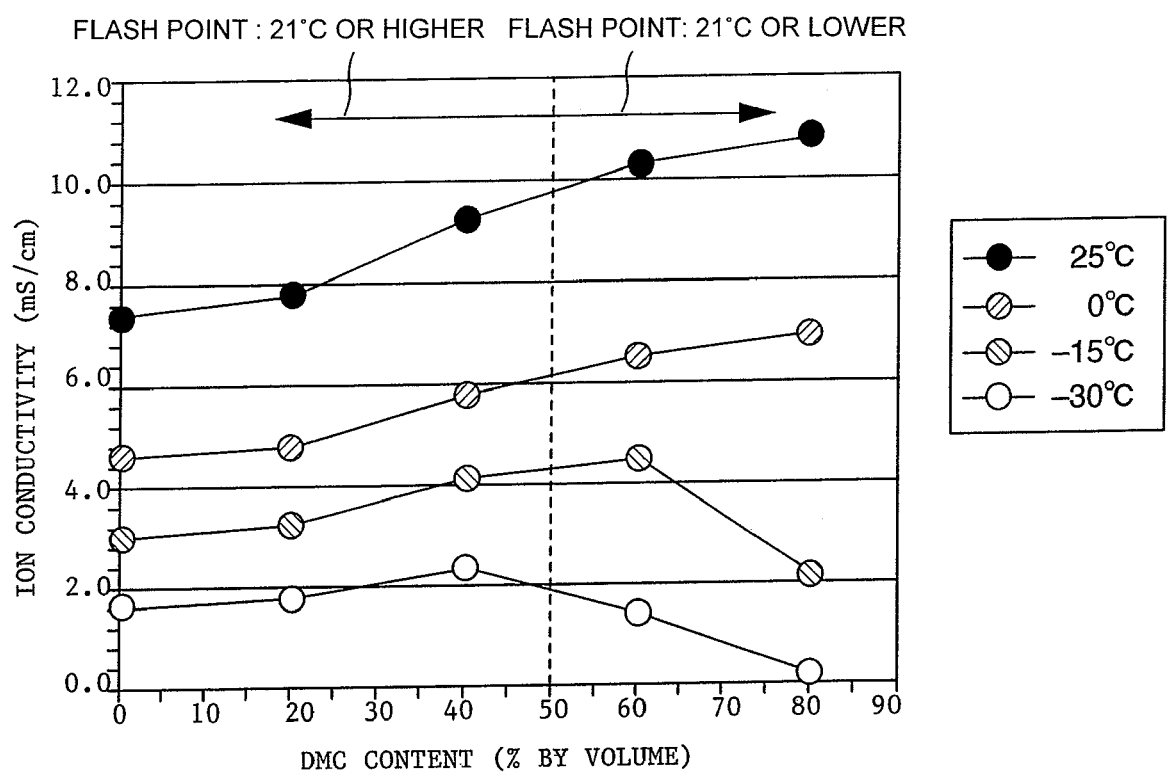
FIG. 2 shows changes in ion conductivity of the electrolyte solutions used in Examples with DMC content.

The electrolyte solution preferably has a flash point of 21° C. or higher and an ion conductivity of 2 mS/cm or more at −30° C. to simultaneously satisfy safety and low-temperature characteristics. FIG. 2 shows an ion conductivity of mixed electrolyte solutions of EC/VC/DMC/EMC having a composition ratio of 19.4/0.6/X/80-X % by volume, changing with the DMC/EMC volume ratio. The results indicate that the electrolyte solution has a flash point of 21° C. or higher and an ion conductivity of 2 mS/cm or more at −30° C. when the DMC/EMC volume ratio is set at 0.6 to 1.3. The ratio of 0.8 to 1 is more preferable, because it gives a flash point of 21° C. or higher and an ion conductivity of 2.2 mS/cm or more at −30° C.

(Fabrication of Spirally Wound Battery)

A spirally wound battery of Example 1 was fabricated by the following procedure. FIG. 1 is a cross-sectional view illustrating one side of the battery.

A cathode material paste was prepared using $LiMn_{1/3}Ni_{1/3}Co_{1/3}O_2$ as a cathode-active material, carbon black (CB1) and graphite (GF1) as electroconductive materials, polyvinylidene fluoride (PVDF) as a binder, and N-methylpyrrolidone (NMP) as a solvent to have a composition ratio of $LiMn_{1/3}Ni_{1/3}Co_{1/3}O_2$:CB1:GF1:PVDF of 86:9:2:3 by mass (dry basis).

The cathode material paste was spread over an aluminum foil, which became a cathode-side current collector 1, dried at 80° C., roll-pressed, and dried at 120° C. to prepare a cathode mixture layer 2 on the cathode-side current collector 1. The cathode mixture layer had a porosity set at 30% based on the whole layer (the value is hereinafter referred to as cathode porosity).

Next, an anode material paste was prepared using pseudo-anisotropic carbon as amorphous carbon serving as an anode-active material, carbon black (CB2) as an electroconductive material, PVDF as a binder and NMP as a solvent, to have a composition of pseudo-anisotropic carbon:CB2:PVDF of 88:5:7 by mass (dry basis).

The anode material paste was spread over a copper foil, which became an anode-side current collector 3, dried at 80° C., roll-pressed, and dried at 120° C. to prepare an anode mixture layer 4 on the anode-side current collector 3. The anode mixture layer had a porosity set at 35% based on the whole layer (the value is hereinafter referred to as anode porosity), so as to form a battery.

A separator 7 was placed between the cathode and anode prepared above to form a spirally wound assembly, which was encased in an anode battery can 13. The electrolyte solution prepared in Example 1 was injected into the assembly and sealed by caulking to form a spirally wound battery.

The other components shown in FIG. 1 are 9: anode-side lead, 10: cathode-side lead, 11: cathode-side insulator, 12: anode-side insulator, 14: gasket, and 15: cathode battery lid.

(Evaluation of Porosity)

Porosity was determined by mercury porosimetry for the cathode and anode after the mixture layer was separated from the current collector of each side.

(Evaluation of Battery)

The spirally wound battery illustrated in FIG. 1 was evaluated for direct current resistance (DCR) at 25 and −30° C., and pulse cycle characteristics (characteristics after the battery was subjected to pulse cycles for 1000 hours).

The battery was charged with electricity at a constant current of 0.7 A to 4.1 V, and then at a constant voltage of 4.1 V until the amperage reached 20 mA. Then, it was allowed to discharge electricity to 2.7 V at 0.7 A, after it was halted for 30 minutes. These cycles were repeated 3 times.

Next, the battery was charged with electricity at a constant current of 0.7 A to 3.8 V, allowed to discharge electricity at 10 A for 10 seconds, again charged with electricity to 3.8 V at a constant current, allowed to discharge electricity at 20 A for 10 seconds, again charged with electricity to 3.8 V, and allowed to discharge electricity at 30 A for 10 seconds.

The battery was evaluated for DCR based on the I-V characteristics observed.

Moreover, the battery was subjected to a pulse cycle test in which charging/discharging were repeated at 20 A for 2 seconds in a constant-temperature bath kept at 50° C., and evaluated for DCR at 25 and −30° C., after it was subjected to the pulse cycles for 1000 hours. The evaluation results are given in Table 1.

Example 2

An electrolyte solution was prepared by dissolving $LiPF_6$ as a lithium salt to a concentration of 1 M in a mixed solvent of EC:VC:DMC:EMC having a composition ratio of 19.5:0.5:40:40 by volume, and evaluated for ion conductivity and inflammability in the same manner as in Example 1.

A spirally wound battery was prepared, and evaluated for porosity and battery characteristics in the same manner as in Example 1. It was confirmed to have a cathode porosity of 30% and anode porosity of 35%, all percentages by volume. The evaluation results are given in Table 1.

Example 3

An electrolyte solution was prepared by dissolving $LiPF_6$ as a lithium salt to a concentration of 1 M in a mixed solvent of EC:VC:DMC:EMC having a composition ratio of 19.6:0.4:40:40 by volume, and evaluated for ion conductivity and inflammability in the same manner as in Example 1.

A spirally wound battery was prepared, and evaluated for porosity and battery characteristics in the same manner as in Example 1. It was confirmed to have a cathode porosity of 30% and anode porosity of 35%, all percentages by volume. The evaluation results are given in Table 1.

Example 4

An electrolyte solution was prepared by dissolving $LiPF_6$ as a lithium salt to a concentration of 1 M in a mixed solvent of EC:VC:DMC:EMC having a composition ratio of 19.8:0.2:40:40 by volume, and evaluated for ion conductivity and inflammability in the same manner as in Example 1.

A spirally wound battery was prepared, and evaluated for porosity and battery characteristics in the same manner as in Example 1. It was confirmed to have a cathode porosity of 30% and anode porosity of 35%, all percentages by volume. The evaluation results are given in Table 1.

Example 5

An electrolyte solution was prepared by dissolving $LiPF_6$ as a lithium salt to a concentration of 1 M in a mixed solvent of EC:VC:DMC:EMC having a composition ratio of 19.7:0.3:40:40 by volume, and evaluated for ion conductivity and inflammability in the same manner as in Example 1.

A spirally wound battery was prepared, and evaluated for porosity and battery characteristics in the same manner as in Example 1. It was confirmed to have a cathode porosity of 30% and anode porosity of 35%, all percentages by volume. The evaluation results are given in Table 1.

Example 6

An electrolyte solution was prepared by dissolving $LiPF_6$ as a lithium salt to a concentration of 1 M in a mixed solvent of EC:VC:DMC:EMC having a composition ratio of 21.7:0.3:38:40 by volume, and evaluated for ion conductivity and inflammability in the same manner as in Example 1.

A spirally wound battery was prepared, and evaluated for porosity and battery characteristics in the same manner as in Example 1. It was confirmed to have a cathode porosity of 30% and anode porosity of 35%, all percentages by volume. The evaluation results are given in Table 1.

Example 7

An electrolyte solution was prepared by dissolving $LiPF_6$ as a lithium salt to a concentration of 1 M in a mixed solvent of EC:VC:DMC:EMC having a composition ratio of 23.7:0.3:36:40 by volume, and evaluated for ion conductivity and inflammability in the same manner as in Example 1.

A spirally wound battery was prepared, and evaluated for porosity and battery characteristics in the same manner as in Example 1. It was confirmed to have a cathode porosity of 30% and anode porosity of 35%, all percentages by volume. The evaluation results are given in Table 1.

Example 8

An electrolyte solution was prepared by dissolving $LiPF_6$ as a lithium salt to a concentration of 1 M in a mixed solvent of EC:VC:DMC:EMC having a composition ratio of 29.7:0.3:30:40 by volume, and evaluated for ion conductivity and inflammability in the same manner as in Example 1.

A spirally wound battery was prepared, and evaluated for porosity and battery characteristics in the same manner as in Example 1. It was confirmed to have a cathode porosity of 30% and anode porosity of 35%, all percentages by volume. The evaluation results are given in Table 1.

Example 9

An electrolyte solution was prepared by dissolving $LiPF_6$ as a lithium salt to a concentration of 1.2 M in a mixed solvent of EC:VC:DMC:EMC having a composition ratio of 23.7:0.3:36:40 by volume, and evaluated for ion conductivity and inflammability in the same manner as in Example 1.

A spirally wound battery was prepared, and evaluated for porosity and battery characteristics in the same manner as in Example 1. It was confirmed to have a cathode porosity of 30% and anode porosity of 35%, all percentages by volume. The evaluation results are given in Table 1.

Example 10

An electrolyte solution was prepared by dissolving $LiPF_6$ as a lithium salt to a concentration of 1.1 M in a mixed solvent of EC:VC:DMC:EMC having a composition ratio of 23.7:0.3:36:40 by volume, and evaluated for ion conductivity and inflammability in the same manner as in Example 1.

A spirally wound battery was prepared, and evaluated for porosity and battery characteristics in the same manner as in Example 1. It was confirmed to have a cathode porosity of 30% and anode porosity of 35%, all percentages by volume. The evaluation results are given in Table 1.

Example 11

An electrolyte solution was prepared by dissolving $LiPF_6$ as a lithium salt to a concentration of 1.1 M in a mixed solvent of EC:VC:DMC:EMC having a composition ratio of 23.7:0.3:36:40 by volume, and evaluated for ion conductivity and inflammability in the same manner as in Example 1.

A spirally wound battery was prepared, and evaluated for porosity and battery characteristics in the same manner as in Example 1. It was confirmed to have a cathode porosity of 25% and anode porosity of 25%, all percentages by volume. The evaluation results are given in Table 1.

Example 12

An electrolyte solution was prepared by dissolving $LiPF_6$ as a lithium salt to a concentration of 1.1 M in a mixed solvent of EC:VC:DMC:EMC having a composition ratio of 23.7:0.3:36:40 by volume, and evaluated for ion conductivity and inflammability in the same manner as in Example 1.

A spirally wound battery was prepared, and evaluated for porosity and battery characteristics in the same manner as in Example 1. It was confirmed to have a cathode porosity of 35% and anode porosity of 40%, all percentages by volume. The evaluation results are given in Table 1.

Example 13

An electrolyte solution was prepared by dissolving $LiPF_6$ as a lithium salt to a concentration of 1.1 M in a mixed solvent of EC:VC:DMC:EMC having a composition ratio of 23.7:0.3:36:40 by volume, and evaluated for ion conductivity and inflammability in the same manner as in Example 1.

A spirally wound battery was prepared, and evaluated for porosity and battery characteristics in the same manner as in Example 1. It was confirmed to have a cathode porosity of 40% and anode porosity of 40%, all percentages by volume. The evaluation results are given in Table 1.

Comparative Example 1

A comparative electrolyte solution was prepared by dissolving $LiPF_6$ as a lithium salt to a concentration of 1 M in a mixed solvent of EC:VC:DMC:EMC:methyl acetate (MA) having a composition ratio of 29.4:0.6:30:30:10 by volume, and evaluated for ion conductivity and inflammability in the same manner as in Example 1.

A spirally wound battery was prepared, and evaluated for porosity and battery characteristics in the same manner as in Example 1. It was confirmed to have a cathode porosity of 30% and anode porosity of 35%, all percentages by volume. The evaluation results are given in Table 1.

Comparative Example 2

A comparative electrolyte solution was prepared by dissolving $LiPF_6$ as a lithium salt to a concentration of 1 M in a mixed solvent of EC:VC:DMC:EMC having a composition ratio of 34:0:33:33 by volume, and evaluated for ion conductivity and inflammability in the same manner as in Example 1.

A spirally wound battery was prepared, and evaluated for porosity and battery characteristics in the same manner as in Example 1. It was confirmed to have a cathode porosity of 30% and anode porosity of 35%, all percentages by volume. The evaluation results are given in Table 1.

Comparative Example 3

A comparative electrolyte solution was prepared by dissolving $LiPF_6$ as a lithium salt to a concentration of 1 M in a mixed solvent of EC:VC:DMC:EMC having a composition ratio of 15:0:35:50 by volume, and evaluated for ion conductivity and inflammability in the same manner as in Example 1.

A spirally wound battery was prepared, and evaluated for porosity and battery characteristics in the same manner as in Example 1. It was confirmed to have a cathode porosity of 30% and anode porosity of 35%, all percentages by volume. The evaluation results are given in Table 1.

Comparative Example 4

A comparative electrolyte solution was prepared by dissolving $LiPF_6$ as a lithium salt to a concentration of 1 M in a mixed solvent of EC:VC:DMC:EMC having a composition ratio of 18:2:40:40 by volume, and evaluated for ion conductivity and inflammability in the same manner as in Example 1.

A spirally wound battery was prepared, and evaluated for porosity and battery characteristics in the same manner as in Example 1. It was confirmed to have a cathode porosity of 30% and anode porosity of 35%, all percentages by volume. The evaluation results are given in Table 1.

Comparative Example 5

A comparative electrolyte solution was prepared by dissolving $LiPF_6$ as a lithium salt to a concentration of 1.1 M in a mixed solvent of EC:VC:DMC:EMC having a composition ratio of 23.7:0.3:36:40 by volume, and evaluated for ion conductivity and inflammability in the same manner as in Example 1.

A spirally wound battery was prepared, and evaluated for porosity and battery characteristics in the same manner as in Example 1. It was confirmed to have a cathode porosity of 20% and anode porosity of 20%, all percentages by volume. The evaluation results are given in Table 1.

Comparative Example 6

A comparative electrolyte solution was prepared by dissolving $LiPF_6$ as a lithium salt to a concentration of 1.1 M in a mixed solvent of EC:VC:DMC:EMC having a composition ratio of 23.7:0.3:36:40 by volume, and evaluated for ion conductivity and inflammability in the same manner as in Example 1.

A spirally wound battery was prepared, and evaluated for porosity and battery characteristics in the same manner as in Example 1. It was confirmed to have a cathode porosity of 38% and anode porosity of 40%, all percentages by volume. The evaluation results are given in Table 1.

by volume than those prepared in Examples 1 to 13 is not preferable, because of its lower DCR at 25° C.

The battery prepared in Comparative Example 4 with an electrolyte solution containing VC at a higher content of 2% by volume than those prepared in Examples 1 to 13 is not preferable, because of its lower DCR at 25 and −30° C.

The battery prepared in Comparative Example 5 with lower porosities of 20% by volume in the cathode and anode than those prepared in Examples 1 to 13 is not preferable, because of its higher DCR at 25 and −30° C.

The battery prepared in Comparative Example 6 with a higher porosity of 45% by volume in each of the cathode and anode than those prepared in Examples 1 to 13 is not preferable, because of its higher DCR at 25 and −30° C.

TABLE 1

| | | Electrolyte solution composition | | | | | Porosity | | | Ion conductivity | Initial characteristics | | Pulse cycle characteristics after subjected to pulse cycles for 1000 hours | |
|---|---|---|---|---|---|---|---|---|---|---|---|---|---|---|
| | | EC | VC | DMC | EMC | MA | (vol %) | | Inflam- | | DCR | DCR | Output maintenance ratio | Output maintenance ratio |
| | $LiPF_6$ (M) | (vol %) | (vol %) | (vol %) | (vol %) | (vol %) | Cathode | Anode | mability at 20° C. | @−30° C. (mS/cm) | @25° C. (mΩ) | @−30° C. (mΩ) | @25° C. (%) | @−30° C. (%) |
| Example 1 | 1 | 19.4 | 0.6 | 40 | 40 | 0 | 30 | 35 | Not observed | 2.3 | 67 | 610 | 84 | 83 |
| Example 2 | 1 | 19.5 | 0.5 | 40 | 40 | 0 | 30 | 35 | Not observed | 2.3 | 66 | 603 | 85 | 84 |
| Example 3 | 1 | 19.6 | 0.4 | 40 | 40 | 0 | 30 | 35 | Not observed | 2.3 | 66 | 595 | 85 | 83 |
| Example 4 | 1 | 19.8 | 0.2 | 40 | 40 | 0 | 30 | 35 | Not observed | 2.3 | 65 | 595 | 86 | 85 |
| Example 5 | 1 | 19.7 | 0.3 | 40 | 40 | 0 | 30 | 35 | Not observed | 2.3 | 63 | 590 | 88 | 87 |
| Example 6 | 1 | 21.7 | 0.3 | 38 | 40 | 0 | 30 | 35 | Not observed | 2.3 | 63 | 590 | 88 | 87 |
| Example 7 | 1 | 23.7 | 0.3 | 36 | 40 | 0 | 30 | 35 | Not observed | 2.3 | 62 | 592 | 88 | 87 |
| Example 8 | 1 | 29.7 | 0.3 | 30 | 40 | 0 | 30 | 35 | Not observed | 2.0 | 62 | 615 | 84 | 83 |
| Example 9 | 1.2 | 23.7 | 0.3 | 36 | 40 | 0 | 30 | 35 | Not observed | 2.2 | 63 | 592 | 88 | 87 |
| Example 10 | 1.1 | 23.7 | 0.3 | 36 | 40 | 0 | 30 | 35 | Not observed | 2.2 | 61 | 592 | 88 | 87 |
| Example 11 | 1.1 | 23.7 | 0.3 | 36 | 40 | 0 | 25 | 25 | Not observed | 2.2 | 63 | 600 | 88 | 87 |
| Example 12 | 1.1 | 23.7 | 0.3 | 36 | 40 | 0 | 35 | 40 | Not observed | 2.2 | 65 | 610 | 88 | 87 |
| Example 13 | 1.1 | 23.7 | 0.3 | 36 | 40 | 0 | 40 | 40 | Not observed | 2.2 | 66 | 620 | 88 | 87 |
| Comparative Example 1 | 1 | 29.4 | 0.6 | 30 | 30 | 10 | 30 | 35 | Observed | 2.3 | 68 | 675 | 83 | 82 |
| Comparative Example 2 | 1 | 34 | 0 | 33 | 33 | 0 | 30 | 35 | Not observed | 1.9 | 68 | 850 | 72 | 69 |
| Comparative Example 3 | 1 | 15 | 0 | 35 | 50 | 0 | 30 | 35 | Not observed | 2.3 | 75 | 680 | 68 | 67 |
| Comparative Example 4 | 1 | 18 | 2 | 40 | 40 | 0 | 30 | 35 | Not observed | 2.3 | 70 | 750 | 83 | 82 |
| Comparative Example 5 | 1.1 | 23.7 | 0.3 | 36 | 40 | 0 | 20 | 20 | Not observed | 2.2 | 70 | 730 | 82 | 75 |
| Comparative Example 6 | 1.1 | 23.7 | 0.3 | 36 | 40 | 0 | 45 | 45 | Not observed | 2.2 | 70 | 700 | 83 | 77 |

The battery prepared in Comparative Example 1 with an electrolyte solution containing MA exhibits good characteristics, in particular lower DCR at −30° C. than the other Comparative Examples; with MA-free electrolyte solutions. Nevertheless, it is not preferable because of inflammability observed at 20° C., and lower pulse cycle characteristics after it is subjected to pulse cycles for 1000 hours than those prepared in Examples 1 to 13.

The battery prepared in Comparative Example 2 with an electrolyte solution containing EC at a higher content of 34% by volume than those prepared in Examples 1 to 13 is not preferable, because of its higher DCR at −30° C.

The battery prepared in Comparative Example 3 with an electrolyte solution containing EC at a lower content of 15%

As discussed above, each of Examples 1 to 13 can provide a lithium secondary battery which exhibits improved safety, in particular with an electrolyte solution exhibiting no inflammability at room temperature (20° C.), while not deteriorating output characteristics at low temperatures and room temperature, and output maintenance characteristics when the battery is preserved at high temperature (50° C.).

Moreover, the lithium secondary battery prepared in each of Examples 1 to 13 as a high-output battery has improved DCR at low temperatures and low-temperature input/output characteristics over conventional ones.

Still more, the lithium secondary battery prepared in each of Examples 1 to 13 has improved characteristics, in particular output characteristics at low temperatures, which make the battery effective for use in vehicles frequently working in cold districts. The improved output characteristics at low temperatures bring advantages of reducing size and weight of a module in which the batteries are assembled to produce power of several hundred volts by reducing a required number of the batteries.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A lithium secondary battery provided with a cathode and an anode, both capable of storing/releasing lithium ions, a separator which separates these electrodes from each other, and an electrolyte solution,
   wherein solvents of the electrolyte solution consist of ethylene carbonate (EC) in an amount of 18.0 to 30.0% by volume, dimethyl carbonate (DMC) and ethyl methyl carbonate (EMC) in an amount of 74.0 to 81.9% by volume, wherein a DMC/EMC ratio by volume is 0.6 to 1.3, and vinylene carbonate (VC) in an amount of 0.1 to 1.0% by volume based on the whole solvents.

2. The lithium secondary battery according to claim 1, wherein the cathode comprises a lithium composite oxide represented by the formula $LiMn_xM1_yM2_zO_2$ (wherein, M1 is at least one selected from the group consisting of Co and Ni, M2 is at least one selected from the group consisting of Co, Ni, Al, B, Fe, Mg and Cr, x+y+z=1, $0.2 \leqq x \leqq 0.6$, $0.2 \leqq y \leqq 4$ and $0.05 \leqq z \leqq 4$).

3. The lithium secondary battery according to claim 1, wherein the anode comprises at least one of carbonaceous material, an oxide of an element belonging to the IV group and a nitride of an element belonging to the IV group.

4. The lithium secondary battery according to claim 1, wherein
   the cathode comprises a cathode mixture and a cathode-side current collector,
   the cathode mixture comprising a cathode-active material, an electroconductive agent and a binder is spread on the cathode-side current collector to form a cathode mixture layer thereon, the cathode mixture layer having a porosity of 25 to 40% by volume, inclusive, based on the layer,
   the anode comprises an anode mixture and an anode-side current collector, and
   the anode mixture comprising an anode-active material, an electroconductive agent and a binder is spread on the anode-side current collector to form an anode mixture layer thereon, the anode mixture layer having a porosity of 25 to 40% by volume, inclusive, based on the layer.

5. The lithium secondary battery according to claim 1, wherein
   the DMC and EMC are incorporated in a DMC/EMC ratio of 0.8 to 1.0 by volume.

6. The lithium secondary battery according to claim 1, wherein the anode comprises a carbonaceous material having a $d_{002}$ value of 0.39 nm or less.

7. The lithium secondary battery according to claim 5, wherein
   the cathode is formed by spreading, on an aluminum foil, a cathode mixture comprising a lithium composite oxide, an electroconductive agent mainly composed of graphite-base carbonaceous material and a binder,
   the cathode mixture layer has a porosity of 25 to 40% by volume, inclusive, based on the layer,
   the anode is formed by spreading, on a copper foil, an anode mixture comprising amorphous carbon, an electroconductive agent and a binder, and
   the anode mixture layer has a porosity of 25 to 40% by volume, inclusive, based on the layer.

8. The lithium secondary battery according to claim 7, wherein the electrolyte solution has a flash point of 20° C. or higher and an ion conductivity of 2 mS/cm or more at −30° C.

* * * * *